B. K. PITTMAN & E. N. KRING.
PLANT SUPPORT.
APPLICATION FILED JUNE 11, 1908.
917,655.
Patented Apr. 6, 1909.
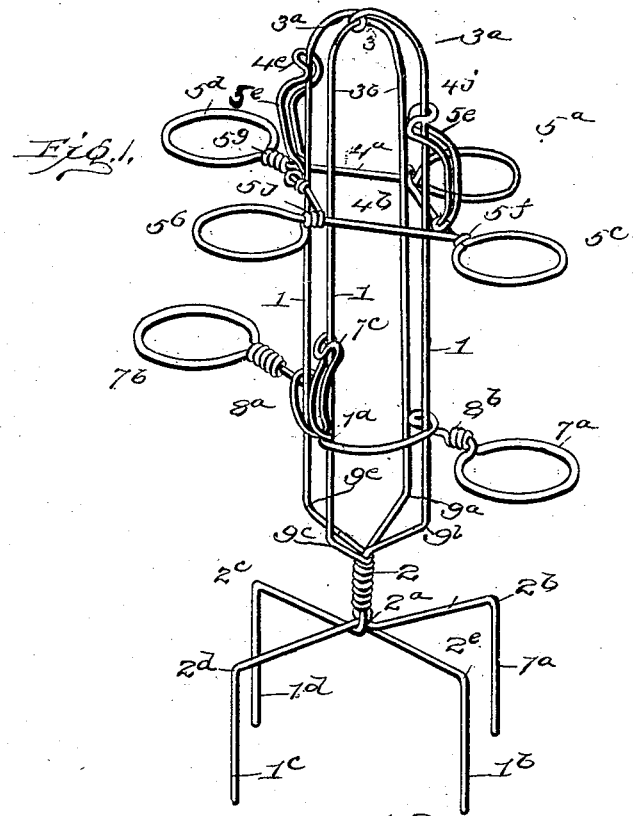
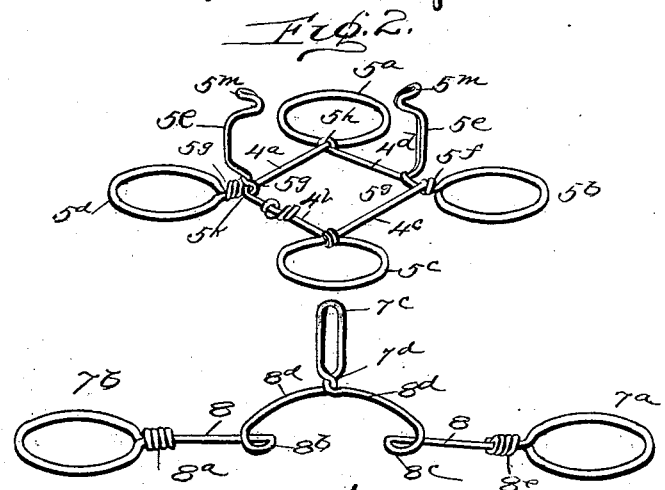
Witnesses
J. M. Fowler Jr.
Joseph J. O'Brien
Inventors
Baltzer K. Pittman
Edward N. Kring
By Mason Fenwick & Lawrence
Attorneys

UNITED STATES PATENT OFFICE.

BALTZER K. PITTMAN AND EDWARD N. KRING, OF FAIRBURY, ILLINOIS.

PLANT-SUPPORT.

No. 917,655.    Specification of Letters Patent.    Patented April 6, 1909.

Application filed June 11, 1908. Serial No. 437,960.

*To all whom it may concern:*

Be it known that we, BALTZER K. PITTMAN and EDWARD N. KRING, citizens of the United States, residing at Fairbury, in the county of Livingston and State of Illinois, have invented certain new and useful Improvements in Plant-Supports; and we do hereby declare the following to be a full, clear, and exact description of the invention, such as will enable others skilled in the art to which it appertains to make and use the same.

This invention relates to trellises or plant supports, and is particularly designed for supporting carnations.

The invention also relates to the class of plant supports in which a central upright frame terminates at its lower end in forks adapted to enter the ground, said frame supporting a series of rings inclosing the stems of growing plants, said rings being in a horizontal plane and vertically adjustable upon said upright frame.

The object of the invention is to provide a supporting device for flower plants that can be quickly applied and readily adjusted.

Another object of this invention is to provide an improved construction for the central upright frame in a flower support of the class described, whereby a better anchorage in the ground is secured and a stable upright position is assured.

A further object of the invention is to provide improved rings for enveloping the stems of growing plants and the connecting parts of said rings whereby the number of rings upon one supporting frame may be increased to the maximum number practical.

A still further object of the invention is to provide for a rigid support of said rings upon the central supporting frame.

With these and other objects in view our invention comprises certain constructions, combinations and arrangements of parts as will be hereinafter more fully described and claimed.

In the accompanying drawings: Figure 1 is a perspective view of one embodiment of our invention. Fig. 2 is a perspective view of a four ringed flower stem holder, and Fig. 3 is a perspective view of a two ringed flower stem holder.

In the construction of our invention we provide a central upright frame which consists of four vertical and parallel sections 1—1—1—1. These sections are rigidly united at the upper end of the frame as shown at 3 and are also rigidly united as shown at 2, then bent at right angles as shown at $2^a$ and again bent at right angles as shown at $2^b$, $2^c$, $2^d$ and $2^e$ to form legs to be inserted in the flower bed. By this construction a framework is formed having a plurality of upright sections or members that are firmly held in their respective places by a turn in one of the wires at 3, and the wrapping of the wires together at 2. The wires after having been wrapped together at 2 are bent for forming the respective legs $1^a$, $1^b$, $1^c$, and $1^d$. These legs may be spaced any desired distance from the stem of the frame, namely, the twisted portion 2 and form bracing and securing means that will prevent the main framework or sections comprising members 1 from being upset.

In Fig. 2 a four ringed stem holder 2 is shown which is preferably formed of a single section of wire or other material, and is provided with rings $5^a$, $5^b$, $5^c$, $5^d$ and are connected together by the sections $4^a$, $4^b$, $4^c$, $4^d$. Extensions $5^e$—$5^e$ are provided with bent portions $5^m$—$5^m$ that project outwardly and are adapted to embrace two of the sections 1—1. This construction permits the entire member shown in Fig. 2 to be applied to the upper end of the supporting frame $3^a$, and by pressing the same downward the upright members 1—1 are engaged by parts of the four ringed flower support which may be vertically adjusted upon said central support. It will be observed that the members $5^e$—$5^e$ form resilient clamping means that engage two of the uprights or sections 1—1 for holding the stem holder in position, the respective bars $4^a$, $4^b$, $4^c$ and $4^d$ acting as braces and assisting the clamping members $5^e$—$5^e$. It is to be observed the four ringed flower stem holder may be put in position upon the central upright with the projecting parts $5^e$—$5^e$ upon the upper surface as shown in Fig. 1, or the entire four ringed flower holder may be inverted to cause the projecting parts $5^e$—$5^e$ to extend below the plane of the said flower stem holder and still engage two of the upright sections 1—1 of the central upright support. It is also to be observed that two or more four ringed flower stem holders shown in Fig. 2 may be applied at different altitudes upon the central upright as the growing plant may require.

In Fig. 3 a flower stem holder is shown having two rings 7ª—7ᵇ with connecting parts 8—8 bent at 8ᵇ and 8ᶜ with the curved portions 8ᵈ, and extension 7ᵈ with an outward projecting portion 7ᶜ similar to 5ᵉ for adapting the holder for use by applying to the upright central frame and permitting the engagement of three of the upright sections 1—1—1 on the central support. This form of stem holder or support is adapted to receive the stems of only two plants and may be applied and removed whenever desired, and also may be used by itself or with another holder having rings arranged as 7ª and 7ᵇ, or may be used in connection with the holder shown in Fig. 2 in which four rings are presented.

The function of the extensions 5ᵉ—5ᵉ, Fig. 1, with the outward projecting parts 5ᵐ—5ᵐ and also of the projecting extension 7ᵈ with its outward projecting part 7ᶜ is to cause additional rigidity by firmly engaging or clamping two of the upright sections 1—1 at a point above or below the plane of the ring holders.

In use the legs 1ª, 1ᵇ, 1ᶜ and 1ᵈ are inserted in the ground and also the horizontal parts radiating from the center of the supporting frame at 2 are covered with dirt, then two or more four ringed flower stem holders are placed upon the central supporting frame. The stems of four plants may be inserted in the rings and all held in a rigid position by one central supporting frame. When the device is to be used in a single row of plants the two ring flower supporting parts shown at Fig. 3 may be placed upon the upright frame.

The frame is composed of the sections 1—1—1—1 and the stem 2 is held in position by the respective legs 1ª, 1ᵇ, 1ᶜ and 1ᵈ, and by the reason of the fact that the legs are spread out to a considerable distance and positioned at right angles to each other the framework is braced substantially in all directions, and will thereby resist strain or any tendency to knock over the same. This frame may be used then for supporting stem holders of the kind shown in Fig. 2 upon which are presented four rings for inclosing the plant stem, or the stem holders as shown in Fig. 3 may be used. Also it will be evident that one kind of each holder may be used if so desired. In addition it will be noted that the respective stem holders may be applied and removed at will without removing the support from the ground so that when only one holder is placed upon the support for holding the stem of flowers for a certain length of time and it is desired to add another holder, the second holder may be added without removing the support on the first holder.

What we claim is:

1. In a flower support, a plurality of uprights, a plurality of stem-engaging members having integral stem portions formed to engage certain of said uprights, and bracing means engaging certain other of said uprights.

2. In a flower support, a support formed with four parallel sections, four supporting feet extending therefrom and positioned at right angles to each other, said feet being adapted to enter the earth, in combination with removable holders for supporting the stems of flowers.

3. In a flower support, a supporting member, feet extending therefrom adapted to enter the earth for supporting said support, and a four ringed stem holder, said four ringed stem holder being formed with clamping means for clamping said support.

4. In a flower support, a frame formed of four uprights, a stem, a foot for each of said uprights extending from said stem and adapted to enter the earth, a holder formed of four rings, and clamping members, said clamping members being adapted to clamp all of said uprights.

5. In a flower support, a plurality of uprights, a plurality of rings having integral stem portions bent to engage certain of said uprights, and resilient bracing means engaging certain other of said uprights.

6. In a flower support, a plurality of connected uprights, a plurality of flower stem engaging members having integral stem portions bent to engage certain of said uprights, the said stem portions being formed with integral bracing means engaging certain other of said uprights.

7. In a flower support, a plurality of connected uprights, a plurality of flower stem engaging elements having connecting portions bent to engage certain of the uprights, and means upon the said connecting portion for engaging another of said uprights for bracing said means.

In testimony whereof we affix our signatures in presence of two witnesses.

BALTZER K. PITTMAN.
EDWARD N. KRING.

Witnesses:
MARGARET DIMMICK,
ETHEL SIMMONS.